United States Patent
Launchbury et al.

(10) Patent No.: US 7,227,946 B2
(45) Date of Patent: Jun. 5, 2007

(54) AUTOMATED PERMUTATION METHOD AND APPARATUS

(75) Inventors: John Launchbury, Beaverton, OR (US); Thomas Nordin, Beverton, OR (US); Mark Tullsen, Beaverton, OR (US); William Bradley Martin, Ft. Meade, MD (US)

(73) Assignees: Oregon Health & Science University, Portland, OR (US); National Security Agency, Ft. Meade, MD (US)

( * ) Notice: Subject to any disclaimer, the term of this patent is extended or adjusted under 35 U.S.C. 154(b) by 327 days.

(21) Appl. No.: 10/826,163

(22) Filed: Apr. 16, 2004

(65) Prior Publication Data

US 2005/0036608 A1 Feb. 17, 2005

Related U.S. Application Data

(60) Provisional application No. 60/463,608, filed on Apr. 16, 2003.

(51) Int. Cl.
*H04L 9/28* (2006.01)
*G06F 9/44* (2006.01)

(52) U.S. Cl. .................. 380/28; 713/191; 717/168
(58) Field of Classification Search .............. 726/6, 726/18; 380/261, 260; 713/191
See application file for complete search history.

(56) References Cited

U.S. PATENT DOCUMENTS

| | | | | |
|---|---|---|---|---|
| 4,972,478 A * | 11/1990 | Dabbish | ............... | 380/28 |
| 5,970,142 A * | 10/1999 | Erickson | ............... | 713/189 |
| 6,028,939 A * | 2/2000 | Yin | ............... | 713/189 |
| 6,233,337 B1 * | 5/2001 | Etzel et al. | ............... | 380/28 |
| 6,266,411 B1 * | 7/2001 | Etzel et al. | ............... | 380/28 |
| 6,766,489 B1 * | 7/2004 | Piret et al. | ............... | 714/755 |
| 6,813,354 B1 * | 11/2004 | Jakobsson et al. | ............... | 380/37 |
| 6,934,901 B2 * | 8/2005 | Dagan et al. | ............... | 714/747 |
| 6,965,675 B1 * | 11/2005 | Trimberger et al. | ............... | 380/277 |
| 6,985,582 B1 * | 1/2006 | Sano et al. | ............... | 380/42 |
| 7,043,017 B2 * | 5/2006 | Swindlehurst et al. | ............... | 380/29 |

OTHER PUBLICATIONS

Lee et al., "Efficient Permutation Instructions For Fast Software Cryptography", 2001, IEEE, pp. 56-69.*
Wu et al., "CryptoManiac: A Fast Flexible Architecture for Secure Communication", 2001, IEEE, pp. 110-119.*

* cited by examiner

*Primary Examiner*—Matthew B. Smithers
(74) *Attorney, Agent, or Firm*—Schwabe, Williamson & Wyatt, P.C.

(57) ABSTRACT

In a computing system, a method of operation comprises receiving a first permutation specification of a first permutation of a first plurality of inputs, receiving a first permutation modifier and receiving a first interaction specification of a first interaction between first permutation and the first permutation modifier. A second permutation specification of a second permutation of the first plurality of inputs is generated, the second permutation being a composite permutation of the first permutation and the permutation modifier, reflective of the first specified interaction between the first permutation and the first permutation modifier.

38 Claims, 14 Drawing Sheets

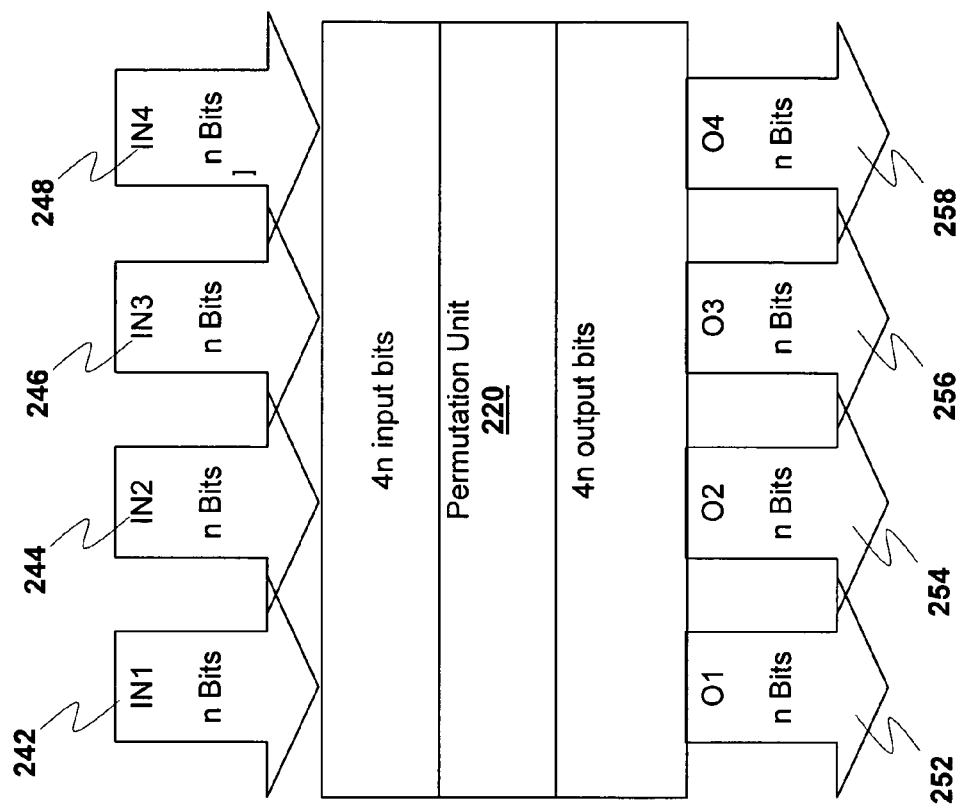

pu1 = PU {perm = 1, ⟿ 910
           o1 = pad 16 (expansion `select` [1..8]),
922
   924      o2 = expansion `select` [17..32],
926        o3 = in1,
   928      o4 = initialPerm `select` [33..48]}
where
    initialPerm = (in3 ++ in4) `into` desIP
932
   934   expansion = (initialPerm `select` [33..48]) `into`
       desE desE = [32, 1, 2, 3, 4, 5, 4, 5, 6, 7, 8, 9,
    8, 9,10,11,12,13,12,13,14,15,16,1]

FIG. 9

```
PU{perm=1,
  O1=[1,1,1,1,1,1,1,1,71,121,113,105,97,89,97,89],
  O2=[99,91,99,91,83,75,67,125,67,125,117,109,101,93,101,93],
  O3=[1,2,3,4,5,6,7,8,9,10,11,12,13,14,15,16],
  O4=[125,117,109,101,93,85,77,69,127,119,111,103,95,87,79,71]
}
```

FIG. 10

```
PERM1 = [O1_31(IN4_16),  O2_31(IN2_31),  O3_31(IN3_31),  O4_31(IN1_31),
         O1_30(IN4_25),  O2_30(IN2_30),  O3_30(IN3_30),  O4_30(IN1_30),
         O1_29(IN4_12),  O2_29(IN2_29),  O3_29(IN3_29),  O4_29(IN1_29),
         O1_28(IN4_11),  O2_28(IN2_28),  O3_28(IN3_28),  O4_28(IN1_28),
         O1_27(IN4_3),   O2_27(IN2_27),  O3_27(IN3_27),  O4_27(IN1_27),
         O1_26(IN4_20),  O2_26(IN2_26),  O3_26(IN3_26),  O4_26(IN1_26),
         O1_25(IN4_4),   O2_25(IN2_25),  O3_25(IN3_25),  O4_25(IN1_25),
         O1_24(IN4_15),  O2_24(IN2_24),  O3_24(IN3_24),  O4_24(IN1_24),
         O1_23(IN4_31),  O2_23(IN2_23),  O3_23(IN3_23),  O4_23(IN1_23),
         O1_22(IN4_17),  O2_22(IN2_22),  O3_22(IN3_22),  O4_22(IN1_22),
         O1_21(IN4_9),   O2_21(IN2_21),  O3_21(IN3_21),  O4_21(IN1_21),
         O1_20(IN4_6),   O2_20(IN2_20),  O3_20(IN3_20),  O4_20(IN1_20),
         ..              ..
         O1_2(IN4_21),   O2_2(IN2_2),    O3_2(IN3_2),    O4_2(IN1_2),
         O1_1(IN4_28),   O2_1(IN2_1),    O3_1(IN3_1),    O4_1(IN1_1),
         O1_0(IN4_7),    O2_0(IN2_0),    O3_0(IN3_0),    O4_0(IN1_0)];
```

FIG. 11

AUTOMATED PERMUTATION METHOD AND APPARATUS

RELATED APPLICATION

The present application is a non-provisional application of provisional application No. 60/463,608 filed on Apr. 16, 2003, and claims priority to said provisional application, which specification is hereby fully incorporated by reference.

GOVERNMENT FUNDING

This invention was made with Government support under Contract No. NSA MDA904-00-C-2044 awarded by the National Security Agency (NSA). The Government has certain rights in this invention.

FIELD OF THE INVENTION

The present invention relates in general to the field of data processing, and more particularly to the modeling of permutations for programmable devices.

BACKGROUND OF THE INVENTION

Cryptography involves the enciphering and deciphering of messages in secret code or cipher. Cryptography may deal with all aspects of secure messaging, authentication, digital signatures, and the like. The processing involved in such activities may involve complicated mathematical calculations. These calculations are the implementation of cryptographic algorithms. Such calculations have been implemented in software. Software implementations have advantages such as being relatively easy to update. This may be e.g. effectuated by downloading new software to the platform (i.e. hardware) running these algorithms.

Implementing algorithms in software, however, may have several shortcomings. Software implementations of algorithms typically are not able to process information as quickly has hardware implementations. Thus, in speed sensitive applications, frequently specialized hardware is utilized to perform at least a portion of the cryptography related functions.

One method of taking advantage of the speed of the hardware while maintaining the flexibility of software is to utilize programmable logic devices that are capable of being reprogrammed. In a hardware implementation utilizing such logic devices, flexibility may be maintained by the ability to reprogram logic to provide for different implementations as needed. However, by still providing for the operation in hardware, quicker implementations may be achieved as compared to software only implementations.

Whether a cryptographic application is implemented in hardware or software, testing, configuration and/or verification have to be performed prior to its deployment. As described earlier, possible arrangements from successive permutations can become very large, very fast, thus make such testing, configuration, and verification extremely difficult.

BRIEF DESCRIPTION OF THE FIGURES

Embodiments of the present invention will be described referencing the accompanying drawings in which like references denote similar elements, and in which:

FIGS. 2A–2C illustrate block diagrams of various aspects of a crypto processor in accordance with one embodiment.

FIG. 9 illustrates an example configuration file for one permutation for a permutation unit, in accordance with one embodiment.

FIG. 10 illustrates an expanded permutation definition for the definition illustrated in the example of FIG. 9.

FIG. 11 illustrates a portion of a configuration vector generated by the permutation processing engine, in accordance with one embodiment.

DETAILED DESCRIPTION OF ILLUSTRATIVE EMBODIMENTS

Embodiments of the present invention include automated permutation methods and apparatuses. The methods and apparatuses have particular application to generating configuration files for programmable devices within a cryptographic processor, and for ease of understanding, will be primarily described in this context. However, the invention is not so limited, and may be practiced in other contexts.

Various aspects of illustrative embodiments of the invention will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials, and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

The phrase "in one embodiment", "in accordance with one embodiment" and "in the embodiment" are used repeatedly. These phrases generally do not refer to the same embodiment; however, they may. The terms "comprising", "having" and "including" are synonymous, unless the context dictates otherwise.

Figure 1:
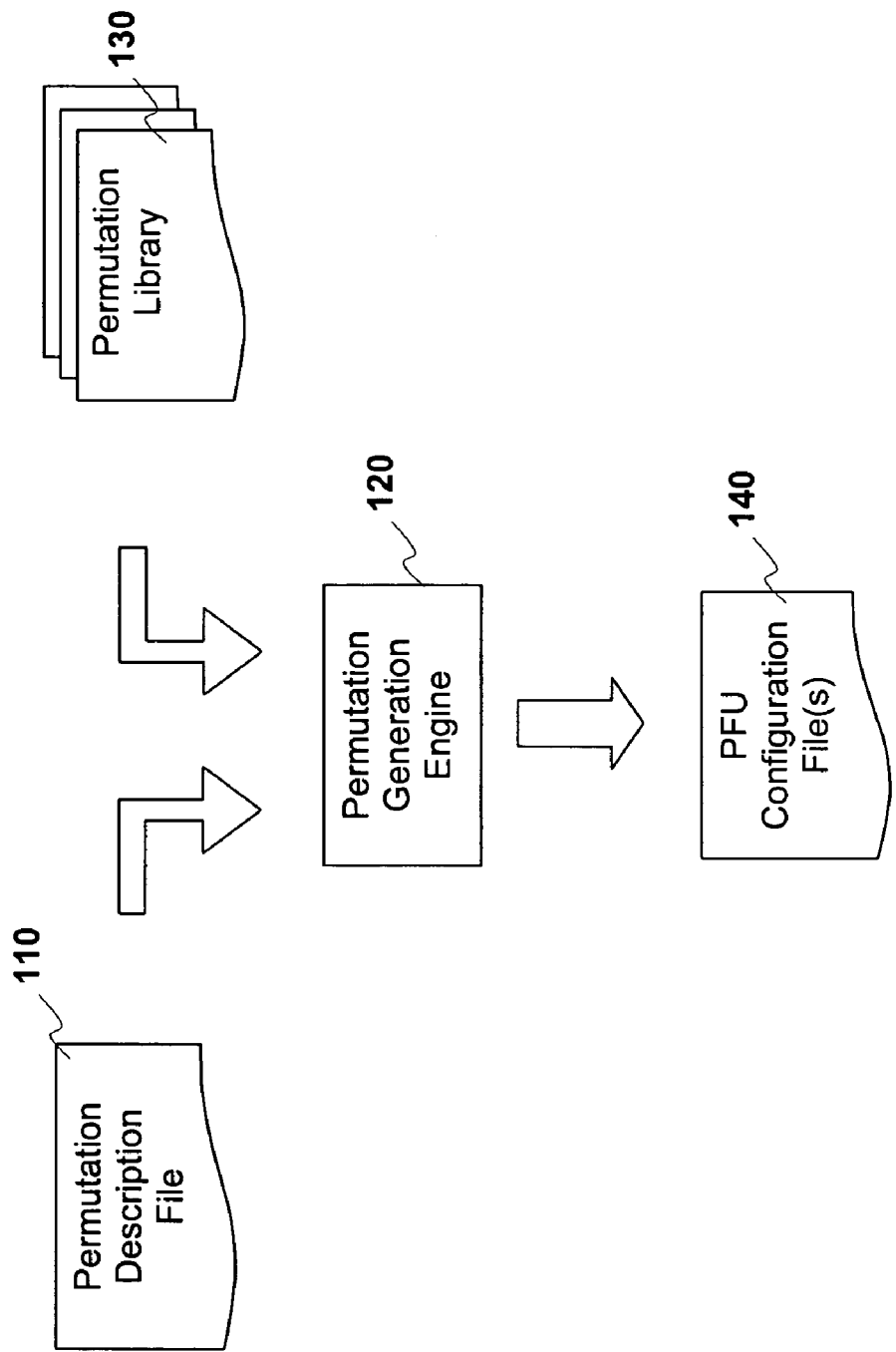
FIG. 1 illustrates a system for automatically generating configurations files for use in configuring programmable devices on cryptography processors, in accordance with one embodiment.

FIG. 1 illustrates a system for automatically generating configurations files for use in configuring programmable devices on cryptography processors, in accordance with one embodiment. In the embodiment illustrated a permutation description file 110 is provided to a permutation generation engine 120. Permutations may be utilized to define the mapping of inputs to a logic device to outputs of the logic device. Optionally, a permutation library 130 is referenced to provide access to preexisting permutations. Examples of preexisting permutations may be Data Encryption Standard (DES) permutations. The permutation engine is utilized to generate one or more permutation unit configuration files 140 for configuring one or more programmable devices on a cryptography processor.

Figure 2A:
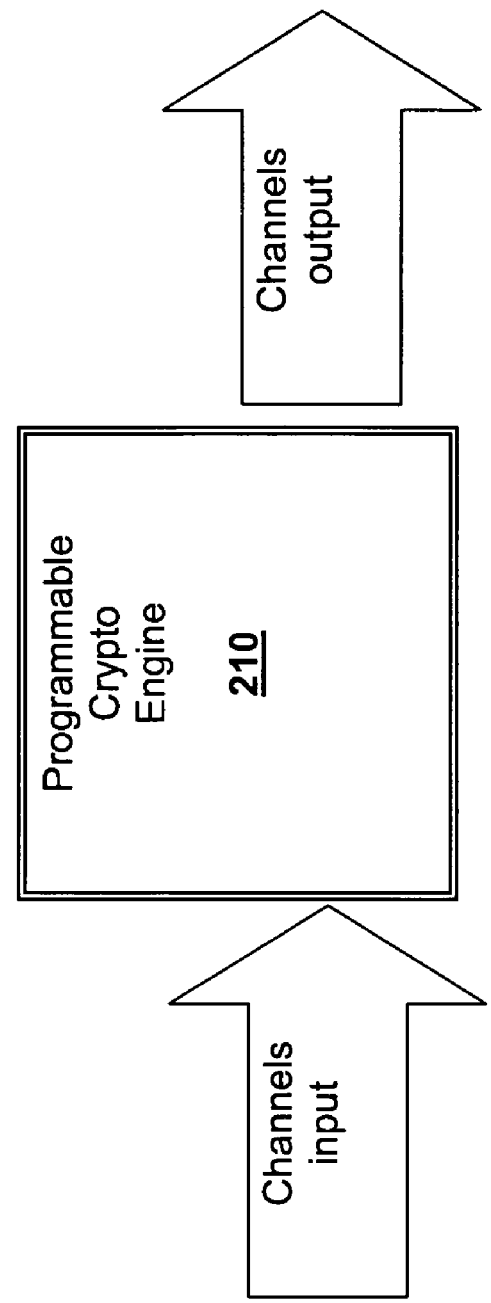
Figure 2B:
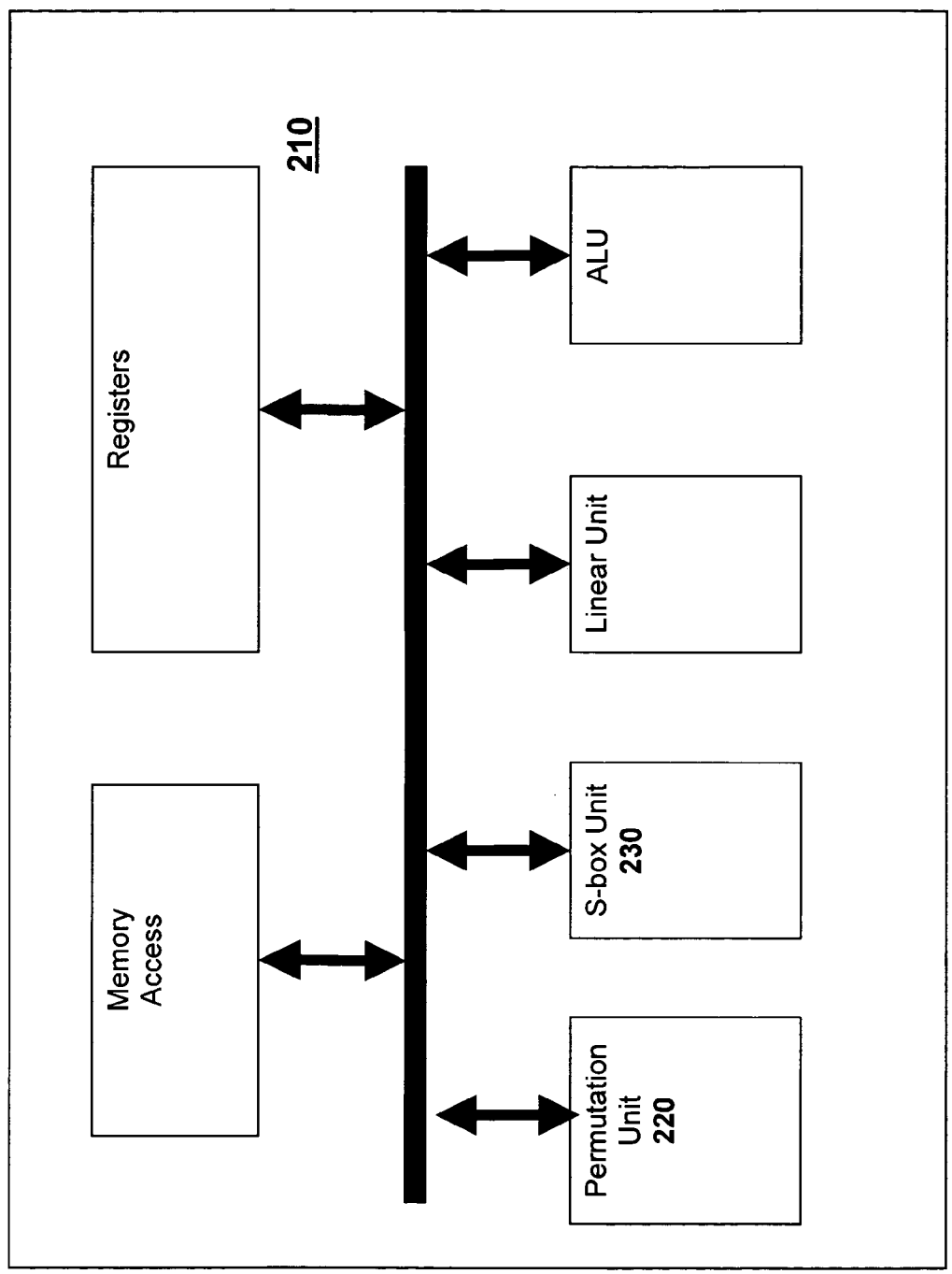

FIG. 2A illustrates a programmable cryptography engine 210. FIG. 2B illustrates a block diagram of a portion of a programmable cryptography engine 210. Various portions of the programmable cryptography engine 210, such as permutation unit 220 and s-box unit 230, may be programmed.

FIG. 2C illustrates inputs and outputs for a permutation unit 220, in accordance with one embodiment. As illustrated in FIG. 2C, 4n inputs 242-248 are provided to input of the permutation unit 220. The inputs 242-248 are divided into four sets of n inputs and identified as IN1-IN4. The permutation unit 220 provides 4n outputs 252-258 divided into four sets of n outputs and identified as O1-O4 252-258. In one embodiment, permutation unit 220 may be able to map any input to any output. In addition, permutation unit 220 may have the ability to map a single input to multiple outputs.

The permutation unit 220 may be programmed utilizing information regarding the mapping (i.e. permuting) of input bits to output bits. The generation of the bit level mapping information is typically performed manually. That is, a user may manually enumerate the mapping of one or more of the inputs 242-248 to one or more of the outputs 252-258. Thus, up to 4n mappings may be entered by the user. In the case that a permutation unit 220 allows for multiple configurations, m, the user may need to manually provide 4n * m mappings.

Such a manual provision of mappings may have several disadvantages. First, the process may be error prone. This results from the manual provision of large numbers of bit patterns. For example, in the embodiment illustrated, the permutation unit may have multiple configurations of mapping 4n inputs and 4n outputs. For a permutation unit supporting eight configurations, this may result in the need to manually enter 4n*8 permutations. This can create large, manually entered configuration files thus creating the potential for error prone entry of configuration information. Second, when a large amount of data is manually entered into configuration files, it may be difficult to trace back the information in the configuration to an original design. Third, such a provision of manual information is time consuming.

As described below, the process illustrated in FIG. 1 may be utilized to receive higher level descriptions of desired permutations and generate the lower level information utilized to program the cryptography engines. By utilizing higher level descriptions to describe the desired programming of the cryptography engines, it is easier to maintain the source files utilized to generate the programming information. It also is easier to correlate the high level source to operations that are being performed by the cryptography engines.

Permutations, as described herein, involve taking a set of inputs and permuting them to a set of outputs. For purposes of explanation, permutations can be specified as a list; with the list being an ordered list of the output of a permutation. The values specified for the outputs correspondingly identify the input sources to be permuted (coupled) to the outputs (which are implicitly specified by the positions to the specified values). For example, a 4 bit rotation to the right may be illustrated as:

[4, 1, 2, 3]

Thus the fourth input is permuted to the first output, the first input is permuted to the second output, and so forth.

A set of operations may be defined to provide interactions between permutations and permutation modifiers. In such a case, names or symbols may be defined for each of the operations in the set. The names are illustrative of the operation being performed. However, the names utilized herein should in no way limited the implementations of embodiments of the invention. In addition, while the specific examples are provided utilizing small, e.g. several bit, permutations, it will be appreciated that the operations may apply to larger permutations.

Figure 3A:
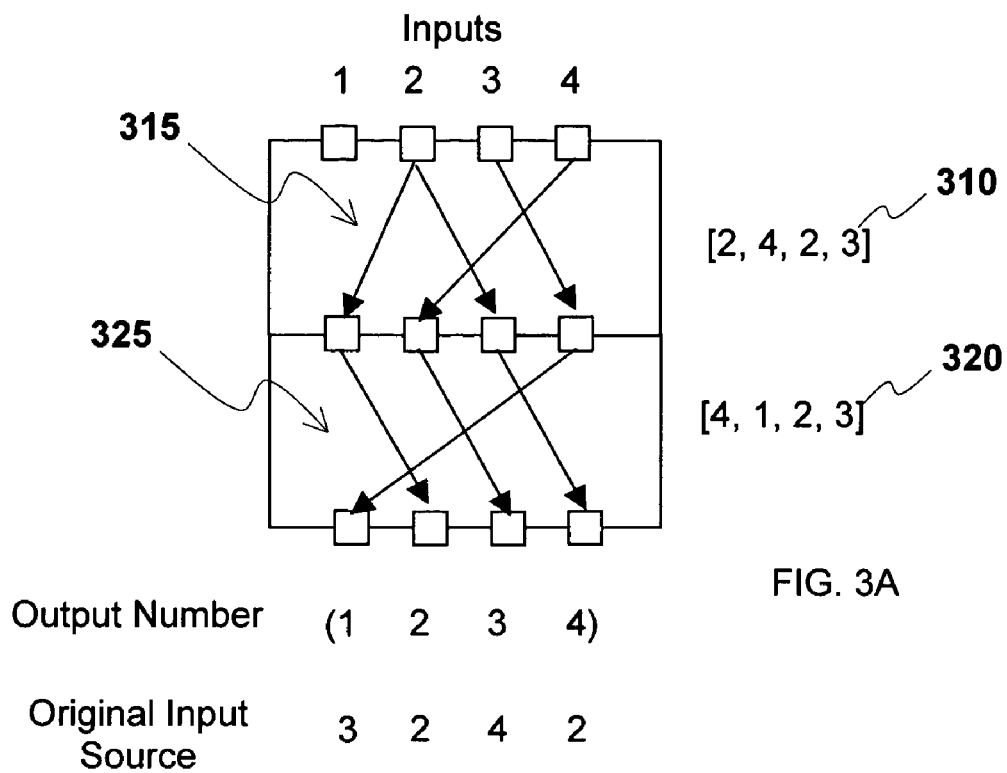
FIGS. 3A–3B illustrates an "into" operation, in accordance with one embodiment, given two permutations.
Figure 3B:
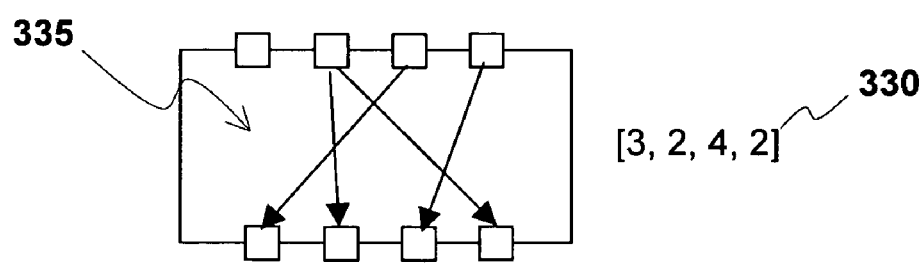

One operator utilized to produce permutations is one that pipes the output of one permutation "into" the input of another. In such a case, the permutation modifier may be another permutation. For example, FIGS. 3A-3B illustrates an "into" operation, in accordance with one embodiment, given two permutations 310 320:

[2, 4, 2, 3] and [4, 1, 2, 3]

The first permutation permutes the second input to the first and third output, the fourth input to the second output and the third input to the fourth, as illustrated 315. The second permutation permutes the inputs to that second permutation as illustrated 325. The composite permutation 335 of the first 310 and second 320 permutation, that is, by inputting into a second permutation the output of a first permutation, is illustrated in FIG. 3B.

Figure 4A:
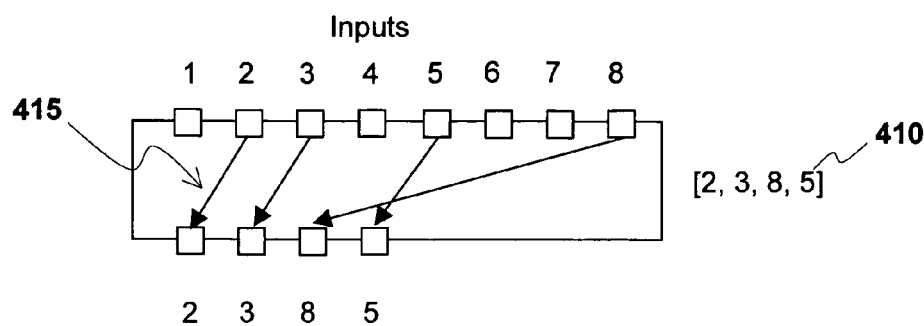
FIGS. 4A–4C illustrate three permutations, with FIGS. 4A and 4B showing two permutations permuting inputs to outputs, and FIG. 4C showing a composite permutation of FIGS. 4A and 4B.
Figure 4B:
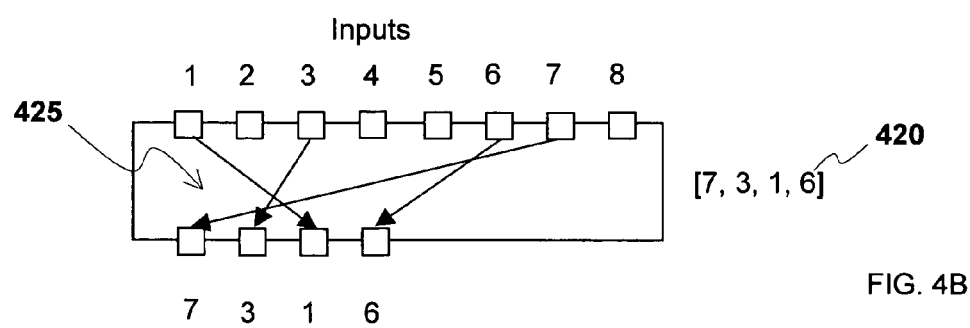
Figure 4C:
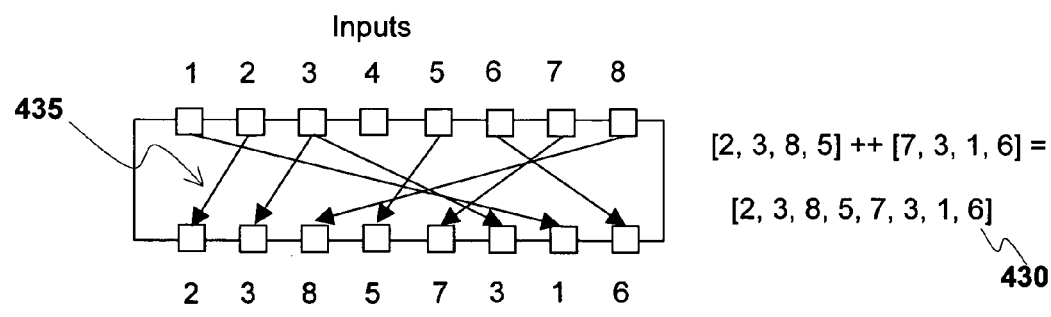

Note that the number of inputs for a permutation does not necessary define the number of outputs. Illustrated in FIGS. 4A-4B are two permutations permuting inputs to outputs. FIG. 4A illustrates 415 a [2, 3, 8, 5] permutation 410 of eight inputs to four outputs. Thus, there are a larger number of inputs than there are outputs. Similarly FIG. 4B illustrates 425 a [7, 3, 1, 6] permutation 420 of eight inputs to four outputs. These two permutations may be "concatenated" (represented by the ++ operation) or joined side by side to form a single, eight input to eight output permutations. FIG. 4C illustrates 435 an example of a composite permutation 430 based on the concatenated permutations of FIGS. 4A and 4B.

Figure 5:
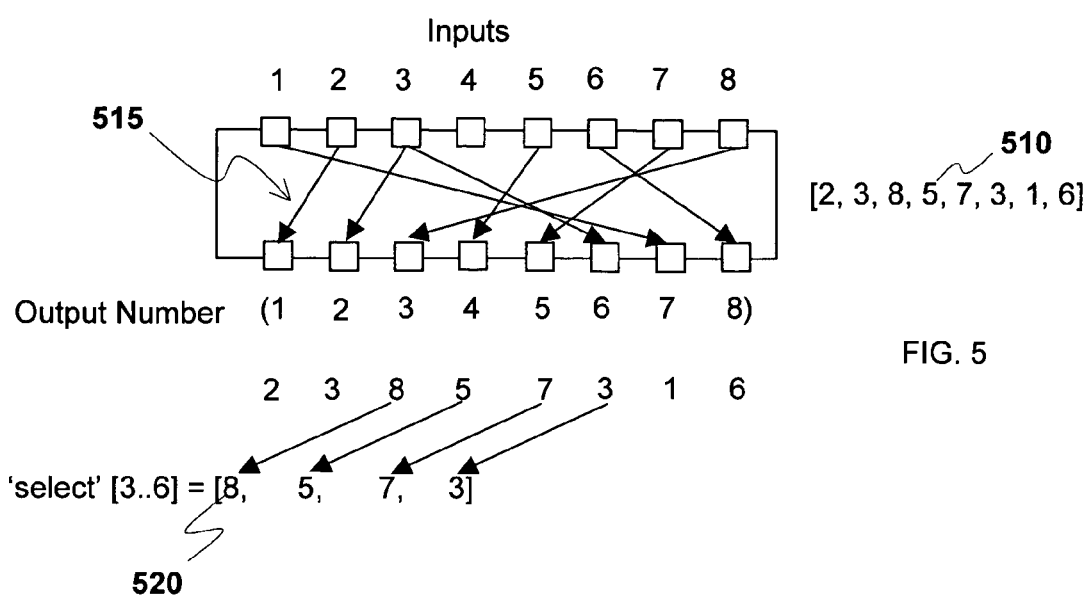
FIG. 5 illustrates a permutation of eight inputs to eight outputs and the generation of a subset from the outputs.

A "select" operation may be performed on a permutation. The select operation may result in a subset of the permutated outputs being selected. FIG. 5 illustrates 515 a permutation of eight inputs to eight outputs 510. Utilizing the permutation illustrated in FIG. 5, a selection can be made of a subset of the outputs of the permutation. Shown below, a permutation modifier [3 . . . 6] is provided. In the embodiment illustrated, the permutation modifier implies that outputs 3 through 6 of the eight outputs of the permutation are to be selected:

[2, 3, 8, 5, 7, 3, 1, 6] 'select' [3 . . . 6]

As a result of the "select" operation, a resulting permutation of [8, 5, 7, 3] 520 may be generated.

Figure 6:
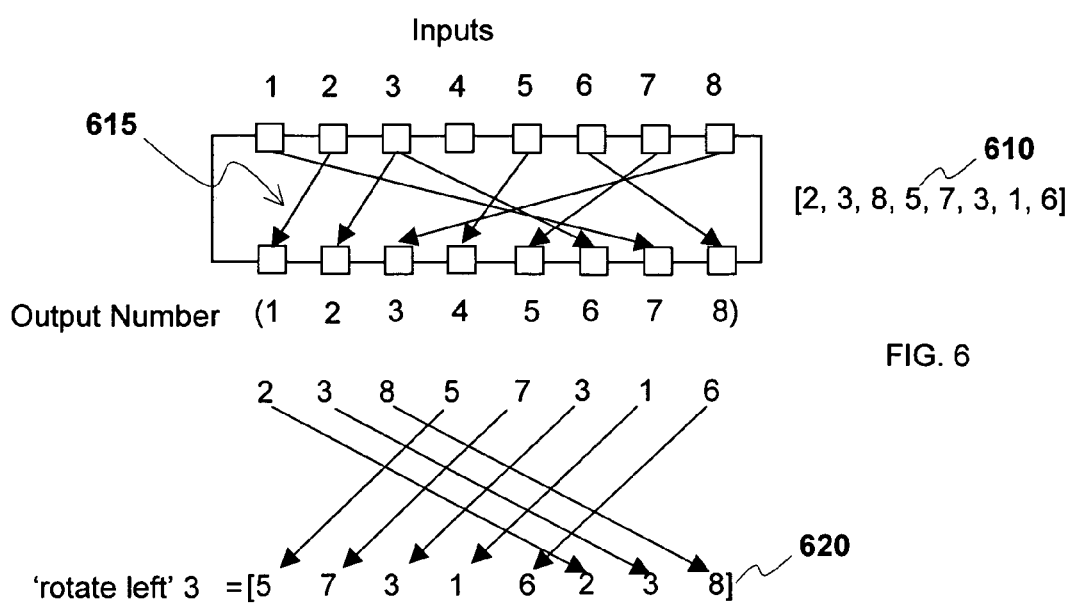
FIG. 6 illustrates a left rotation of a permutation by three positions.

Another set of possible operations on permutations are operations involving the rotation of a permutation. FIG. 6 illustrates 615 a "rotate left" by three positions permutation 610. Thus, a permutation modifier of "3" may be provided:

[2, 3, 8, 5, 7, 3, 1, 6]<<<3 where "<<<" is illustrative of a "rotate left" operation. Eight inputs may be permutated to outputs as illustrated in FIG. 6.

The resulting permutation, [2, 3, 8, 5, 7, 3, 1, 6], may then be left shifted as illustrated 620. In a similar manner, right rotations (i.e. "rotate right") of permutations may be specified. The right rotations perform the shifting of the output of a permutation to the right.

Figure 7:
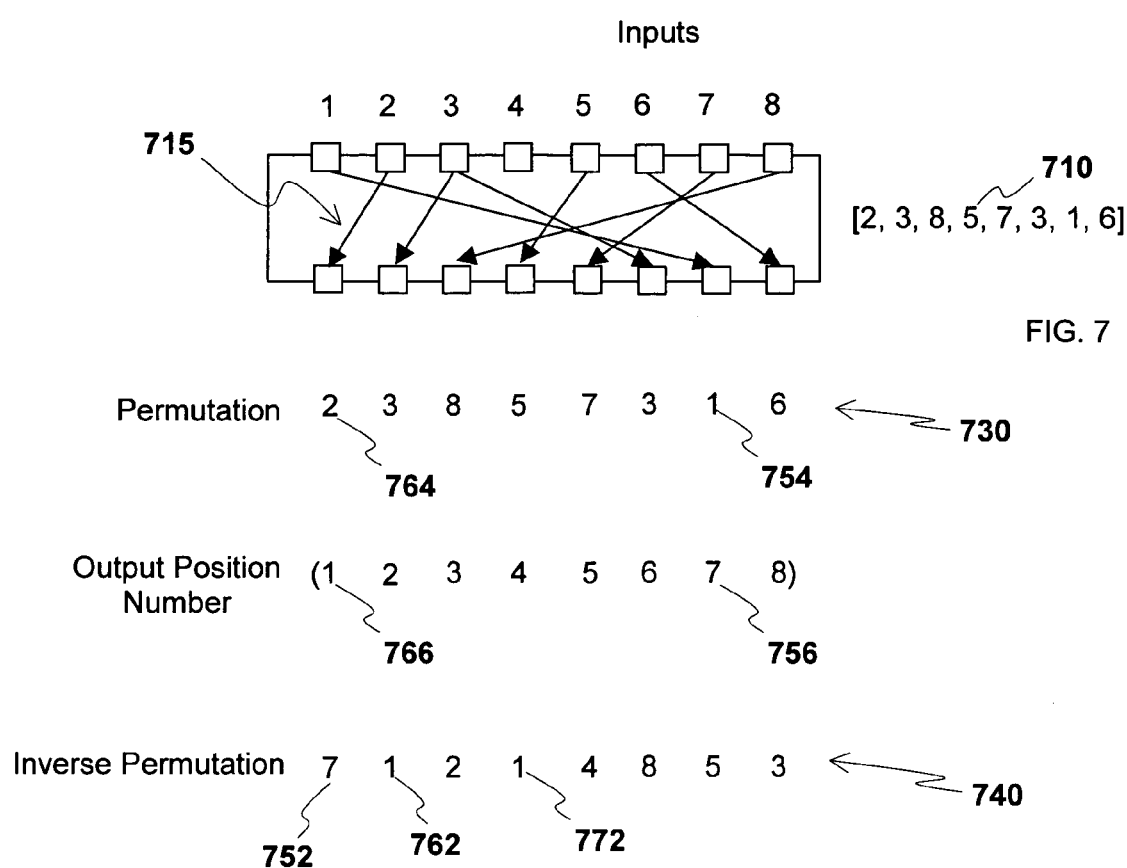
FIG. 7 illustrates an inversion of a permutation, in accordance with one embodiment.

FIG. 7 illustrates an inversion of a permutation, in accordance with one embodiment. As with previous examples, the inputs are permuted to the outputs as specified 710. From this permutation 730 an "inverse" permutation 740 is obtained. The inverse permutation 740 is defined as a permutation where the values in the inverse permutation 740 are the output position numbers in the permutation 730 of the corresponding output position of the inverse permutation 740. For example, the value in the first position (1) 752 of the inverse permutation 740 is the corresponding output position number 756 in the permutation 730 of the input number 1 754. Similarly, the value in the second position (2) 762 in the inverse permutation 740 is the corresponding output position number 766 in the output permutation 730 of the input number 2 764. In this manner, the inverse permutation may be determined. In certain cases, the output position number may not exist in the output permutation. For example, input 4 is not a value in the permutation 730. Thus, the corresponding output position 772 of the inverse permutation reflects this with a 1 in the output permutation 740.

Figure 8:
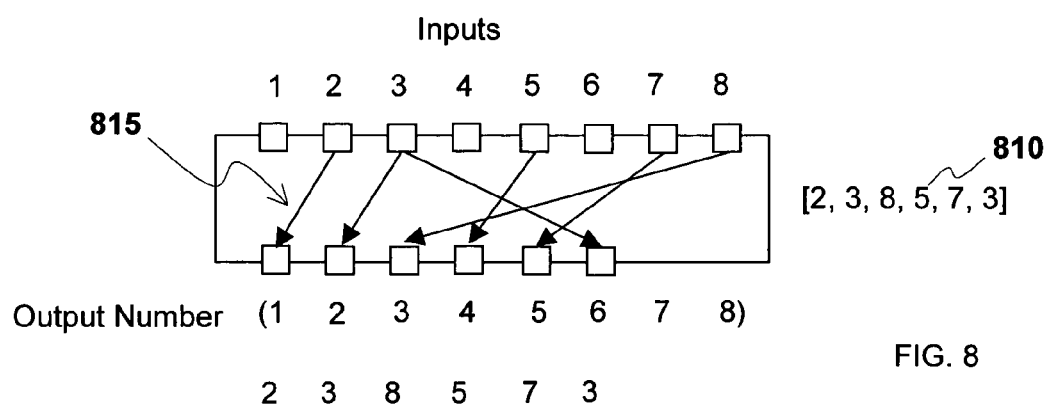
FIG. 8 illustrates the operation of a 'pad' function on a permutation, in accordance with one embodiment.

FIG. 8 illustrates the operation of a "pad" function on a permutation, in accordance with one embodiment. With certain permutations, the permuting of inputs to outputs may result in a permutation that has less entries than a desired width. The output of the permutation 815 in FIG. 8 illustrates a six position permutation [2, 3, 8, 5, 7, 3] 810. However, it may be desired to have an eight position permutation. Thus, a 'pad' operator may be applied to the six position 842 permutation to obtain an eight position permutation 844. The 'pad' operator may have a permutation modifier that specifies the number of positions in the resulting permutation. The padding may be accomplished by adding additional positions to the left of the six entries to form an eight position permutation [1, 1, 2, 3, 8, 5, 7, 3]. In alternative embodiments, a pad operator may operate to add additional positions to the right of the six positions. Additionally, while the illustration shows mapping of the first input, e.g. 1, to the padded outputs, in other embodiments other inputs may be used to pad the outputs.

FIG. 9 illustrates an example configuration file for one permutation for a permutation unit, in accordance with one embodiment. Thus, a configuration number for the defined configuration is provided 910. In various configurations, the number of configurations supported by the permutation unit varies. For example, in one embodiment, the permutation unit may contain up to 16 configurations. In the example illustrated, four n bit outputs O1–O4 922–924 are defined. In addition, three working permutations are defined, desE 930, initialPerm 932 and expansion 934. desE 930 is a permutation defined in the configuration file. initialPerm 932 and expansion 934 are defined utilizing the operators discussed above and additional permutations. This includes a reference to desIP 940, a permutation in a permutation library. Thus the definition desIP 940 is not present in the configuration file but may be read from the permutation library by the permutation generation unit.

FIG. 10 illustrates an expanded permutation definition for the definition illustrated in the example of FIG. 9. That is, utilizing the functions discussed above, in combination with the values defined in the configuration file as well as the permutation library, expanded permutation definitions may be defined. For example, assuming that in1–in4 are defined as in FIG. 2C, then output O3 is mapped to the inputs for in1 which are inputs 1–16. The remaining outputs results from operations as discussed above. FIG. 11 illustrates a portion of a configuration vector generated by the permutation processing engine, in accordance with one embodiment. In the embodiment illustrated, the output illustrates detailed mappings of individual inputs to outputs. The outputs may be in an appropriate condition as to be compliant with programming software for the destined permutation. For example, in one embodiment, the configuration vector may be compliant with a toolkit utilized to compile the configuration vector into a final software image.

Figure 12:
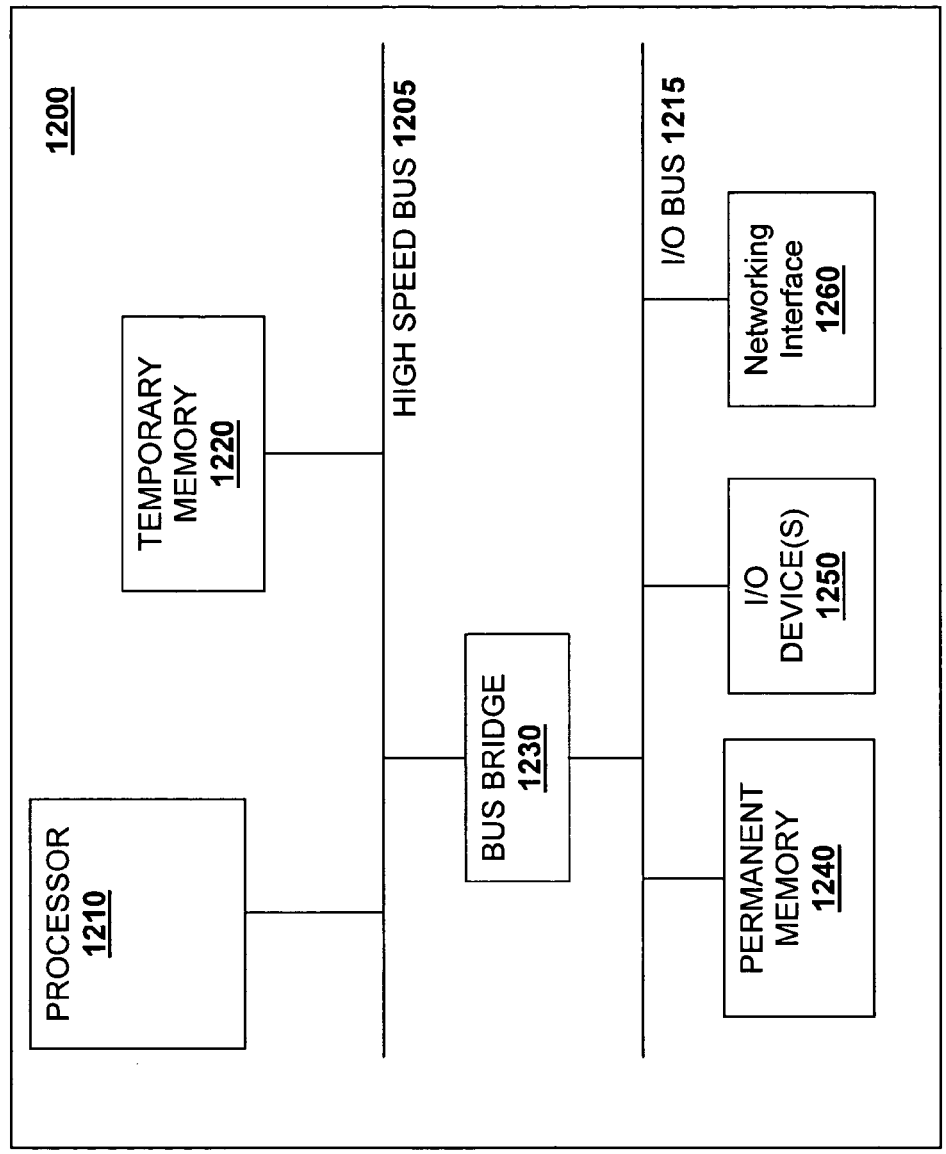
FIG. 12 illustrates a block diagram of a system capable of functioning as a permutation processing engine, in accordance with one embodiment.

FIG. 12 illustrates a block diagram of a system 1200 capable of functioning as a permutation processing engine, in accordance with one embodiment. As shown, the system 1200 includes a processor 1210 and temporary memory 1220, such as SDRAM and DRAM, on high-speed bus 1205. High-speed bus is connected through bus bridge 1230 to input/output (I/O) bus 1215. I/O bus 1215 connects permanent memory 1240, such as flash devices and fixed disk device, networking interface 1260 and I/O devices 1250 to each other and bus bridge 1230.

In the embodiment illustrated, permanent memory may be utilized to store the permutation library and permutation description file. The permutation description file may be structured as functional language statements in a functional language such as Haskell. Additionally, the permutation library may contain library files structured with functional language elements as well. Permanent memory may also comprise a Haskell execution environment for execution by the processor. In such a case the execution of the permutation description file, possibly along with Haskell portions of the permutation library, by the processor may result in the generation of the permutation unit configuration file.

Thus, it can be seen from the above descriptions, a novel method for modeling permutation operations, having particular application to the generating of configuration files for programmable devices on cryptography devices has been described. While the present invention has been described in terms of the foregoing embodiments, those skilled in the art will recognize that the invention is not limited to the embodiments described. The present invention can be practiced with modification and alteration within the spirit and scope of the appended claims.

Thus, the description is to be regarded as illustrative instead of restrictive on the present invention.

The invention claimed is:

1. In a computing system having one or more input devices and a storage medium, a method of enciphering data comprising:
    receiving through the one or more input devices a first permutation specification of a first permutation of a first plurality of data inputs;
    receiving through the one or more input devices a first permutation modifier;
    receiving through the one or more input devices an interaction specification of a first interaction between the first permutation and the first permutation modifier;
    automatically generating and storing in the storage medium a second permutation specification of a second permutation of the first plurality of data inputs, the second permutation resulting from the first permutation and the first permutation modifier reflective of the specified first interaction between the first permutation and the first permutation modifier;

generating a configuration vector to configure a programmable cryptography engine based at least in part on the second permulation specification; and activating said cryptography engine to apply said second permulation specification to set of data to encipher said set of data.

2. The method of claim 1 wherein the first permutation specification specifies the first permutation by specifying values comprising a plurality of input sources for a plurality of outputs in an ordered manner, where positions of the specified values specify the outputs, and the specified values correspondingly identify the input sources of the outputs.

3. The method of claim 1 wherein the first permutation modifier comprises a third permutation specification of a third permutation of a second plurality of data inputs.

4. The method of claim 3 wherein the third permutation specification specifies the third permutation by specifying values comprising a plurality of input sources for a plurality of outputs in an ordered manner, where positions of the specified values specify the outputs, and the specified values correspondingly identify the input sources of the outputs.

5. The method of claim 3 wherein the first interaction specification comprises an 'into' interaction between the first and third permutation specifications where the outputs of the first permutation are provided as the data inputs to the third permutation.

6. The method of claim 3 wherein the first interaction specification comprises a 'concatenate' interaction adjacently joining the first and third permutations.

7. The method of claim 1 wherein the first interaction specification comprises a 'rotate right' interaction where outputs of the first permutation are moved to be outputs immediately to the right of those specified in the first interaction specification.

8. The method of claim 1 wherein the first interaction specification comprises a 'select' interaction where the second permutation comprises a subset of the first permutation.

9. The method of claim 1 wherein the first interaction specification comprises a 'rotate left' interaction where outputs of the first permutation are moved to be outputs immediately to the left of those specified in the first interaction specification.

10. The method of claim 1 wherein the first interaction specification comprises a 'pad' interaction where the second permutation specification is obtained by padding the first permutation specification.

11. The method of claim 1 wherein the first permutation modifier is null and the first interaction specification comprises an 'inverse' interaction where the outputs of the second permutation comprise output position numbers of the first permutation for the corresponding output position of the second permutation.

12. The method of claim 1 wherein the first and second permutations comprise 32 bit permutations.

13. The method of claim 1 further comprising configuring the programmable cryptography engine based at least in part on the generated configuration vector.

14. The method of claim 1 further comprising:
receiving through the one or more input devices a second permutation modifier;
receiving through the one or more input devices a second interaction specification of a second interaction between the second permutation and the second permutation modifier;
automatically generating and storing in the storage medium a third permutation specification of a third permutation of the first plurality of data inputs, the third permutation resulting from the second permutation and the second permutation modifier reflective of the specified second interaction between the second permutation and the second permutation modifier;
generating another configuration vector to configure the programmable cryptography engine based at least in part on the third permutation specification; and
activating said cryptography engine to apply said third permutation specification to another set of data to encipher said another set of data.

15. A computer readable medium comprising:
a storage medium; and
a plurality of executable instructions stored in the storage medium, and designed to program a computing device having one or more input devices and memory to enable the computing device to:
receive through the one or more input devices a first permutation specification of a first permutation of a first plurality of data inputs;
receive through the one or more input devices a first permutation modifier;
receive through the one or more input devices an interaction specification of a first interaction between the first permutation and the first permutation modifier;
automatically generate and store in the memory a second permutation specification of a second permutation of the first plurality of data inputs, the second permutation resulting from the first permutation and the first permutation modifier reflective of the specified first interaction between the first permutation and the first permutation modifier;
generate a configuration vector to configure a programmable cryptography engine based at least in part on the second permutation specification; and
activate said cryptography engine to apply said second permutation specification to a set of data to encipher said set of data.

16. The computer readable medium of claim 15 wherein the first permutation specification specifies the first permutation by specifying values comprising a plurality of input sources for a plurality of outputs in an ordered manner, where positions of the specified values specify the outputs, and the specified values correspondingly identify the input sources of the outputs.

17. The computer readable medium of claim 15 wherein the first permutation modifier comprises a third permutation specification of a third permutation of a second plurality of data inputs.

18. The computer readable medium of claim 17 wherein the first interaction specification comprises an 'into' interaction between the first and third permutation specifications where the outputs of the first permutation are provided as the data inputs to the third permutation.

19. The computer readable medium of claim 17 wherein the first interaction specification comprises a 'concatenate' interaction adjacently joining the first and third permutations.

20. The computer readable medium of claim 15 wherein the first interaction specification comprises a 'rotate right' interaction where outputs of the first permutation are moved to be outputs immediately to the right of those specified in the first interaction specification.

21. The computer readable medium of claim 15 wherein the first interaction specification comprises a 'select' interaction where the second permutation comprises a subset of the first permutation.

22. The computer readable medium of claim 15 wherein the first interaction specification comprises a 'rotate left' interaction where outputs of the first permutation are moved to be outputs immediately to the left of those specified in the first interaction specification.

23. The computer readable medium of claim 15 wherein the first interaction specification comprises a 'pad' interaction where the second permutation specification is obtained by padding the first permutation specification.

24. The computer readable medium of claim 15 wherein the first permutation modifier is null and the first interaction specification comprises an 'inverse' interaction where the outputs of the second permutation comprise output position numbers of the first permutation for the corresponding output position of the second permutation.

25. The computer readable medium of claim 15, wherein the executable instructions are further designed to enable the computing device to configure the programmable cryptography engine based at least in part on the generated configuration vector.

26. The computer readable medium of claim 15, wherein the executable instructions are further designed to enable the computing device to:
receive through the one or more input devices a second permutation modifier;
receive through the one or more input devices a second interaction specification of a second interaction between the second permutation and the second permutation modifier;
automatically generate and store in a storage medium a third permutation specification of a third permutation of the first plurality of data inputs, the third permutation resulting from the second permutation and the second permutation modifier reflective of the specified second interaction between the second permutation and the second permutation modifier;
generate another configuration victor to configure the programmable cryptography engine based at least in part on the third permutation specification; and
activate said cryptography engine to apply said third permutation specification to another set of data to encipher said another set of data.

27. A computing device comprising:
one or more input devices;
storage medium having stored therein a first plurality of executable instructions designed to enable the computing device to:
receive through the one or more input devices a first permutation specification of a first permutation of a first plurality of data inputs;
receive through the one or more input devices a first permutation modifier;
receive through the one or more input devices an interaction specification of a first interaction between the first permutation and the first permutation modifier; and
automatically generate and store in the storage medium a second permutation specification of a second permutation of the first plurality of data inputs, the second permutation resulting from the first permutation and the first permutation modifier reflective of the specified first interaction between the first permutation and the first permutation modifier;
generate a configuration vector to configure a programmable cryptography engine based at least in part on the second permutation specification; and
activate said cryptography engine to apply said second permutation specification to a set of data to encipher said set of data; and
at least one processor coupled to the storage medium to execute the instructions.

28. The computing device of claim 27, wherein the first permutation specification specifies the first permutation by specifying values comprising a plurality of input sources for a plurality of outputs in an ordered manner, where positions of the specified values specify the outputs, and the specified values correspondingly identify the input sources of the outputs.

29. The computing device of claim 27, wherein the first permutation modifier comprises a third permutation specification of a third permutation of a second plurality of data inputs.

30. The computing device of claim 29, wherein the first interaction specification comprises an 'into' interaction between the first and third permutation specifications where the outputs of the first permutation are provided as the data inputs to the third permutation.

31. The computing device of claim 29, wherein the first interaction specification comprises a 'concatenate' interaction adjacently joining the first and third permutations.

32. The computing device of claim 27, wherein the first interaction specification comprises a 'rotate right' interaction where outputs of the first permutation are moved to be outputs immediately to the right of those specified in the first interaction specification.

33. The computing device of claim 27, wherein the first interaction specification comprises a 'select' interaction where the second permutation comprises a subset of the first permutation.

34. The computing device of claim 27, wherein the first interaction specification comprises a 'rotate left' interaction where outputs of the first permutation are moved to be outputs immediately to the left of those specified in the first interaction specification.

35. The computing device of claim 27, wherein the first interaction specification comprises a 'pad' interaction where the second permutation specification is obtained by padding the first permutation specification.

36. The computing device of claim 27, wherein the first permutation modifier is null and the first interaction specification comprises an 'inverse' interaction where the outputs of the second permutation comprise output position numbers of the first permutation for the corresponding output position of the second permutation.

37. The computing device of claim 27, wherein the executable instructions are further designed to configure the programmable cryptography engine based at least in part on the generated configuration vector.

38. The computing device of claim 27, wherein the executable instructions are designed to:
receive through the one or more input devices a second permutation modifier;
receive through the one or more input devices a second interaction specification of a second interaction between the second permutation and the second permutation modifier; and
automatically generate and store in the storage medium a third permutation specification of a third permutation of the first plurality of data inputs, the third permutation resulting from the second permutation and the second permutation modifier reflective of the specified second interaction between the second permutation and the second permutation modifier;

generate another configuration vector to configure the programmable cryptography engine based at least in part on the third permulation specification; and activate said cryptography engine to apply said third permutation specification to another set of data to encipher said another set of data.

* * * * *

UNITED STATES PATENT AND TRADEMARK OFFICE
CERTIFICATE OF CORRECTION

| | | |
|---|---|---|
| PATENT NO. | : 7,227,946 B2 | Page 1 of 1 |
| APPLICATION NO. | : 10/826163 | |
| DATED | : June 5, 2007 | |
| INVENTOR(S) | : John Launchbury et al. | |

It is certified that error appears in the above-identified patent and that said Letters Patent is hereby corrected as shown below:

Column 7
Line 5, "...to set..." should read --...to a set....--.

Column 9
Line 37, "...configuration victor..." should read --...configuration vector...--.

Signed and Sealed this

Eleventh Day of November, 2008

JON W. DUDAS
*Director of the United States Patent and Trademark Office*